United States Patent
Koli et al.

(10) Patent No.: US 10,037,289 B1
(45) Date of Patent: *Jul. 31, 2018

(54) DATA STORAGE SYSTEM WITH EFFICIENT PROCESSING OF SINGLE MAPPING CALLBACK FOR HOST I/O REQUESTS

(71) Applicant: EMC Corporation, Hopkinton, MA (US)

(72) Inventors: Milind M. Koli, Morrisville, NC (US); Timothy C. Ng, Cary, NC (US); James M. Holt, Raleigh, NC (US)

(73) Assignee: EMC IP Holding Company LLC, Hopkinton, MA (US)

(*) Notice: Subject to any disclaimer, the term of this patent is extended or adjusted under 35 U.S.C. 154(b) by 371 days.

This patent is subject to a terminal disclaimer.

(21) Appl. No.: 14/972,421

(22) Filed: Dec. 17, 2015

(51) Int. Cl.
| | |
|---|---|
| G06F 12/00 | (2006.01) |
| G06F 3/06 | (2006.01) |
| G06F 13/00 | (2006.01) |
| G06F 13/28 | (2006.01) |
| G06F 13/10 | (2006.01) |
| G06F 13/16 | (2006.01) |

(52) U.S. Cl.
CPC ........ *G06F 13/102* (2013.01); *G06F 13/1642* (2013.01)

(58) Field of Classification Search
None
See application file for complete search history.

(56) References Cited

U.S. PATENT DOCUMENTS

| | | | |
|---|---|---|---|
| 5,809,516 | A | 9/1998 | Ukai et al. |
| 6,687,764 | B2 | 2/2004 | Sonoda et al. |
| 6,757,705 | B1 | 6/2004 | Pardikar et al. |
| 8,195,871 | B2 | 6/2012 | Kim et al. |
| 2007/0115731 | A1 | 5/2007 | Hung |
| 2012/0324097 | A1 | 12/2012 | Myers et al. |
| 2017/0132058 | A1 | 5/2017 | McNutt |

*Primary Examiner* — Idriss N Alrobaye
*Assistant Examiner* — Dayton Lewis-Taylor
(74) *Attorney, Agent, or Firm* — BainwoodHuang

(57) ABSTRACT

In a data storage system a host I/O request is received from a host-side interface, the host I/O request specifying a range of logical block addresses (LBAs) of a mapped logical unit (MLU). Mapping information is obtained for a plurality of extents of the underlying logical units of storage. If there are a sufficient number of free sub-I/O request tracking structures to track completion of a plurality of respective sub-I/O requests for the extents, then the sub-I/O requests are concurrently issued to the device-side interface, using the mapping information. Upon receiving transfer initiation responses for the sub-I/O requests to initiate transfer of the respective extents, they are forwarded to the host-side interface to cause the respective extents to be transferred to/from the host. As the transfer initiation responses are forwarded to the host-side interface, the respective sub-I/O request tracking structures are freed for use in processing subsequent host I/O requests.

20 Claims, 8 Drawing Sheets

DATA STORAGE SYSTEM WITH EFFICIENT PROCESSING OF SINGLE MAPPING CALLBACK FOR HOST I/O REQUESTS

BACKGROUND

The present invention relates the field of data storage systems.

In data storage systems it is known to employ so-called "mapped" logical storage units or MLUs. An MLU is presented to a host computer as a conventional logical storage unit or LUN, i.e., as consisting of a linear array of blocks of storage and having a device (LUN) identifier that enables a host computer to issue I/O requests to write and read data to/from the MLU. Within the data storage system, however, the MLU is mapped to underlying storage in a more arbitrary way in order to provide certain functional and/or performance advantages. In one example an MLU is a so-called "thin" LUN or TLU for which the underlying storage is allocated only on an as-needed basis. Use of TLUs can provide for more efficient use of physical storage resources. At any given time, one or more logical areas or ranges of the MLU have no underlying storage associated therewith, while other logical areas or ranges do. When a host I/O request directed to an MLU is received at a data storage system, it is necessary to map a range of blocks of the request to one or more distinct units of underlying storage, and then to perform the requested operation on the mapped units of underlying storage.

SUMMARY

A disclosed technique for processing a host I/O request in a data storage system includes issuing multiple sub-I/O requests for respective extents of underlying storage according to mapping information for the range of blocks identified in the host I/O request. While a host-side interface is limited to transferring the extents in a logical or address order, the extents are nonetheless requested concurrently in order to achieve higher performance than if requested and obtained serially. With such concurrent requesting of the extents, there may also be logic for re-ordering the transfer of the extents as may be necessary to maintain an address ordering for the host-side interface. However, there may also be applications where such re-ordering is not required. Another feature of the disclosed technique is the return of mapping information for all the extents in a single mapping response. This facilitates the concurrent requesting of the extents, but it may also be used independently for achieving greater efficiency in looking up mapping information during operation. For reliable and efficient processing of the single mapping response, a technique for managing use of sub-I/O request tracking structures is employed.

More particularly, a method is disclosed of operating a data storage system that includes receiving a host I/O request from a host-side interface of the data storage system, the host I/O request specifying a range of logical block addresses (LBAs) of a mapped logical unit (MLU) of storage presented to an external host computer by the host-side interface, the MLU being mapped through a device-side interface to a plurality of underlying logical units of storage. In response to receiving the host I/O request, mapping information is obtained for a plurality of extents of the underlying logical units of storage, the extents being mapped to respective sub-ranges of the range of LBAs, the host-side interface being configured to transfer the extents during a subsequent transfer phase. Upon obtaining the mapping information, it is determined whether there are a sufficient number of free sub-I/O request tracking structures to track completion of a plurality of respective sub-I/O requests to be used for the extents of the underlying logical units of storage. Only upon there being such a sufficient number of free sub-I/O request tracking structures, then the sub-I/O requests for the extents of the underlying logical units of storage are concurrently issued to the device-side interface, using the mapping information. The device-side interface provides respective transfer initiation responses for the sub-I/O requests to initiate transfer of the respective extents. Upon these being received, they are forwarded to the host-side interface to cause the respective extents to be transferred by the host-side interface in the transfer phase. As the transfer initiation responses are forwarded to the host-side interface, the respective sub-I/O request tracking structures are freed for use in processing subsequent host I/O requests.

In one embodiment, one sub-I/O request tracking structure is utilized to track completion of a corresponding one the sub-I/O requests for a corresponding extent, so that the sufficient number is equal to the number of extents identified in the mapping information.

In one particular embodiment the extents have a logical order according to an address order of the respective sub-ranges of the range of LBAs, and the host-side interface is configured to transfer the extents in the logical order during the transfer phase. The transfer initiation responses are returned in an initial order independent of the logical order of the respective extents, and the forwarding of the transfer initiation responses includes selectively re-ordering the transfer initiation responses as necessary to provide the transfer initiation responses to the host-side interface in the logical order of the respective extents. The selective re-ordering can include detecting an out-of-order transfer initiation response for one of the extents, refraining from forwarding the out-of-order transfer initiation response to the host-side interface, subsequently re-issuing the sub-I/O request for the one extent at a later time when the transfer initiation response for the preceding extent has been received and forwarded to the host-side interface, and then receiving the second transfer initiation response from the device-side interface and forwarding the second transfer initiation response to the host-side interface to cause the one extent to be transferred by the host-side interface in the transfer phase.

The device-side interface may include a memory-based storage cache for caching the underlying units of logical storage of the MLU, and the data transfer phase includes transfer of the extents between the host-side interface and the storage cache. In this case, the initial order of the transfer initiation responses may be based on a pattern of cache hits and misses for the respective extents in the storage cache, a cache hit for a given extent causing immediate return of a corresponding transfer initiation response which is out of order when not preceded by a transfer initiation response for a preceding extent in the logical order due to a cache miss for the preceding extent.

Obtaining the mapping information may include (1) issuing a request for the mapping information to a mapping library, and (2) receiving a mapping information response including identifications of the plurality of extents, and the plurality of sub-I/O requests may be issued concurrently after receiving the mapping information response.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
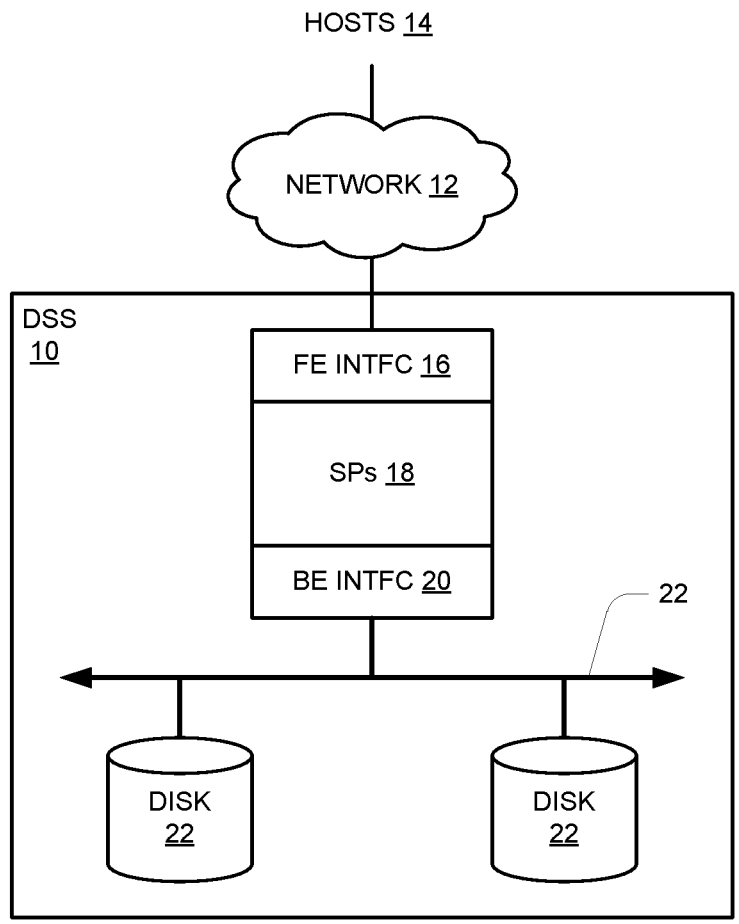
FIG. 1 is a block diagram of a computer system.

FIG. 1 shows a computer system in which a data storage system (DSS) 10 is connected to a network 12 to which a plurality of host computers or hosts 14 are connected. The data storage system 10 includes front-end interface circuitry (FE INTFC) 16 connected to the network 12, a set of storage processors (SPs) 18, and back-end interface circuitry (BE INTFC) 20 connected to disks 22 of the data storage system 10 by a storage-oriented interconnection 24 such as one or more FibreChannel links, etc.

In operation, the hosts 14 generate storage I/O requests and issue them to the data storage system 10 via the network 12. In one embodiment, the I/O requests employ a standardized storage access protocol such as SCSI and are block-oriented requests, i.e., requests for sets of fixed-sized blocks of a disk-like logical storage device presented to the hosts 14 by the data storage system 10. These requests include read and write requests, each typically specifying a range of logical block addresses (LBAs) in terms of a starting LBA and a length value indicating the number of blocks to be transferred. In this case the network 12 may be a storage-oriented network such as a FibreChannel storage area network (SAN), or the system may use a technology such as iSCSI over a conventional communications network such as a TCP/IP network. In an alternative embodiment, the I/O requests are file-oriented requests directed to files of a network file system that are presented to the hosts 14 by the data storage system 10. In this case the network 12 is typically a communications network such as a TCP/IP network, and the data storage device 10 may be referred to as a "network attached storage" or NAS system. The present description refers primarily to the block-oriented application, but the techniques described herein are applicable for use in a file-oriented application.

The FE interface 16 is responsible for handling requests and responses to/from the hosts 14, including transfer of read data responsive to a read request and transfer of write data as part of processing a write request. The BE interface 20 functions as an initiator with respect to the disks 22, generating read and write I/O requests, providing data as part of the write I/O requests, and accepting returned data as part of the read I/O requests. The SPs 18 perform processing to provide a variety of functions, including for example a logical translation between host-facing logical units of storage and corresponding physical units of storage defined on the disks 22. At a high level such functionality is generally known in the art and not elaborated herein. The present description focuses on particular functionality not known in existing systems.

Figure 2:
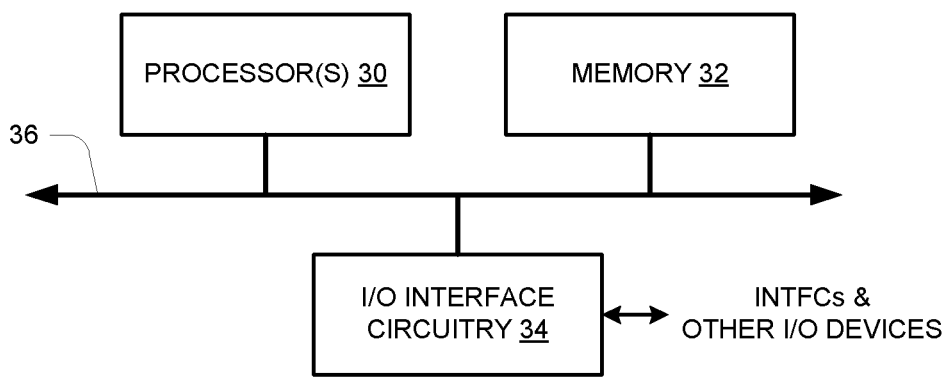
FIG. 2 is a block diagram of a computer from a hardware perspective.

FIG. 2 shows an example configuration of a physical computer such as an SP 18 from a computer hardware perspective. The hardware includes one or more processors 30, memory 32, and interface circuitry 34 interconnected by data interconnections 36 such as one or more high-speed data buses. The interface circuitry 34 provides a hardware connection to the FE and BE interfaces 16, 20 (FIG. 1) and perhaps other external devices/connections (EXT DEVs). The processor(s) 30 with connected memory 32 may also be referred to as "processing circuitry" herein. For non-volatile secondary storage, the hardware may carve out and utilize private portions or partitions of a disk 22. In operation, the memory 32 stores data and instructions of system software (e.g., operating system) and one or more application programs which are executed by the processor(s) 30 to cause the hardware to function in a software-defined manner. Thus the computer hardware executing instructions of a data storage application, for example, can be referred to as a data storage circuit or data storage component, and it will be understood that a collection of such circuits or components can all be realized and interact with each other as one or more sets of computer processing hardware executing different computer programs as generally known in the art. Further, the application software may be stored on a non-transitory computer-readable medium such as an optical or magnetic disk, Flash memory or other non-volatile semiconductor memory, etc., from which it is retrieved for execution by the processing circuitry, as also generally known in the art.

Figure 3:
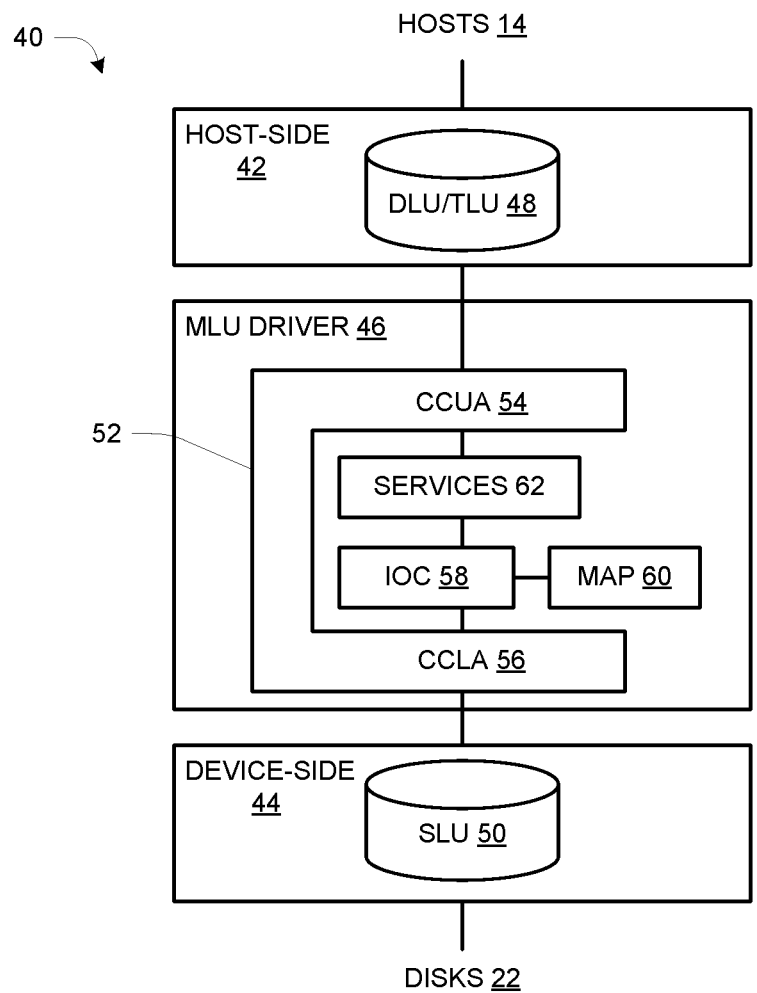
FIG. 3 is a schematic diagram of an organization of software-implemented components in a data storage system.

FIG. 3 shows an organization 40 of an SP 18 in use, i.e., when executing operating software to realize functional components or modules as generally known in the art. The organization 40 includes a host-side interface 42, a device-side interface 44, and a "mapped logical unit" (MLU) driver 46. The logical storage devices presented to the hosts 14 are shown as a direct logical unit or a thin logical unit (DLU/TLU) 48, and the units of storage provided by the disks 22 are represented as system logical units (SLUs) 50. The MLU driver 46 provides a framework to create a pool of storage which is a collection of actual physical storage SLUs. A user (e.g., storage administrator) can then create DLUs and TLUs in that pool. In one embodiment the SLUs 50 may be realized as so-called FLARE LUNs such as used in systems sold by EMC Corporation.

The MLU driver 46 includes a wrapper type of component referred to as a "C clamp" 52, having a C clamp upper arm (CCUA) 54 and a C clamp lower arm (CCLA) 56. Core components include an I/O coordinator (IOC) 58, a mapping library (MAP) 60, and one or more service components 62. In this context, "service" refers to extended or value-added storage functionality such as data compression, deduplication, etc. In one embodiment, the mapping library 60 can be realized using an embedded block file system such as the Common Block File System (CBFS) used in products of EMC Corporation.

The device-side interface 44 may have considerable complexity in some embodiments. For example, it can include any/all of a memory-based storage cache (i.e., DRAM cache), storage tiering including use of Flash memory, and a redundant array of independent disks (RAID) controller. Configurations of this type are generally known and not elaborated further. Specific relevant functionality of the device-side interface 44 is included as part of certain overall operations as described below.

In operation utilizing the organization 40 of FIG. 3, an SP 18 receives host I/O requests at the host-side interface 42, performs various functions within the MLU driver 46, and accesses the disks 22 to transfer data in satisfaction of the requests. It will be appreciated that the use of a cache within the device-side interface 44 has a decoupling effect, i.e., that host I/O requests are satisfied from the cache at a very high rate, and that the disks 22 are accessed for cache misses on reads as well as and on cache flushes. More particularly, a host I/O request is received from the host-side interface 42 at the CCUA 54, passes through the services 62 to IOC 58, then on to CCLA 56 which works in connection with the device-side interface 44 to satisfy the requests. As part of processing requests, the IOC 58 accesses the mapping library 60 to obtain mapping information that translates between the host-facing DLU/TLU 48 and the disk-facing SLU 50. For ease of description herein the services 62 are treated as "no-operation" or pass-through components. Those skilled in the art will appreciate how details may be added or varied to reflect the addition of one or more services.

Figure 4:
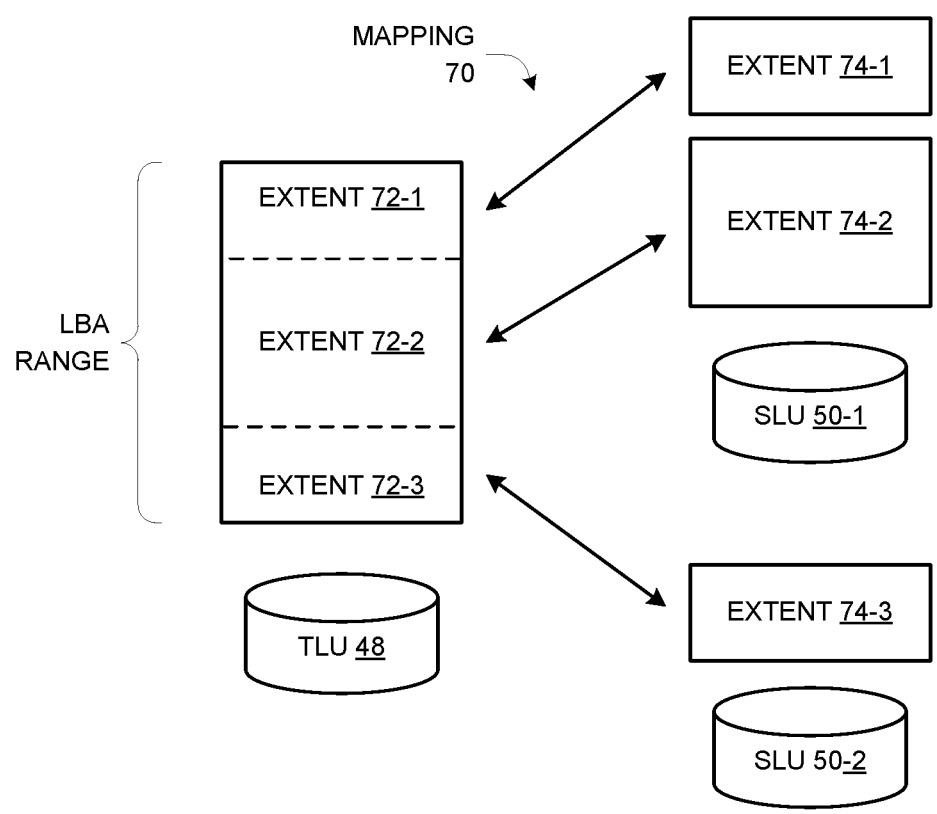
FIG. 4 is a schematic diagram for a mapping from a range of addresses of a host-visible logical unit of storage to extents of underlying system logical units of storage.

FIG. 4 illustrates a mapping 70 such as described above and maintained by the mapping library 60. On the left is a range of LBAs of a TLU 48 as visible to a host 14. As shown, it is logically divided into three sub-ranges or "extents" 72 (shown as 72-1, 72-2 and 72-3), and each of these is mapped via the mapping 70 to a respective extent 74 of a respective SLU 50 provided by the device-side interface 44. In particular, the extents 72-1 and 72-2 are mapped to extents 74-1 and 74-2 on a first SLU 50-1, and the extent 72-3 is are mapped to an extent 74-3 on a second SLU 50-2. The extents 74-1 and 74-2 are not necessarily contiguous on SLU 50-1.

Given the mapping 70, it will be appreciated that a host I/O request directed to the TLU 48 generally involves accessing one or more of the extents 74 and SLUs 50, depending of course on the mapping 70. For purposes of this description the mapping 70 of FIG. 4 is used to present an example of processing of an I/O request for the entire range of blocks made up by extents 72-1 through 72-3. This processing occurs within the MLU driver 46, with particular involvement of the IOC 58 as described more below. Those skilled in the art will appreciate that this example is non-limiting and illustrates more general aspects of operation for more arbitrary host I/O requests.

Returning briefly to FIG. 3, the host side interface 42 initiates only one internal I/O request for each host I/O request it receives; it is up to other components including the MLU driver 46 and device-side interface 44 to perform control operations needed to initiate transfer of separate extents 74 that are needed for a given request. The host-side interface 42 is not aware of the specific mapping that is maintained by the mapping library 60 for the data of any particular host I/O request. The host-side interface 42 can handle a data transfer phase that is broken into different parts for respective extents 72, but it requires that the extents 74 be transferred in address order. Thus, the MLU driver 46 manages underlying data transfers to provide the ordering required by the host-side interface 42.

Another feature of the organization 40 is its use of so-called "data copy avoidance" or DCA technique by which data is transferred to/from the host/side interface 42. Rather than physically copying data among different memory buffers as part of the transfer, the data of an I/O request is maintained within one buffer and is transferred logically by the transfer of pointers to the data. In the case of a write, for example, write data is stored in a memory buffer by the host-side interface 42 and then transferred directly from the memory buffer to the storage cache within the device-side interface 44 through manipulation of the associated pointers. A read is handled in an analogous manner. In the context of MLUs, however, the memory buffer is a single logical buffer that includes multiple sub-buffers for the underlying extents 74, and these sub-buffers are logically ordered according to the sequence in which they are filled or emptied as part of the transfer with the device-side interface 44. As described more below, this aspect of the host-side interface 42 can require re-ordering of the transfer of extents so that the ordering of the sub-buffers mirrors the logical or address ordering of the extents.

Figure 5:
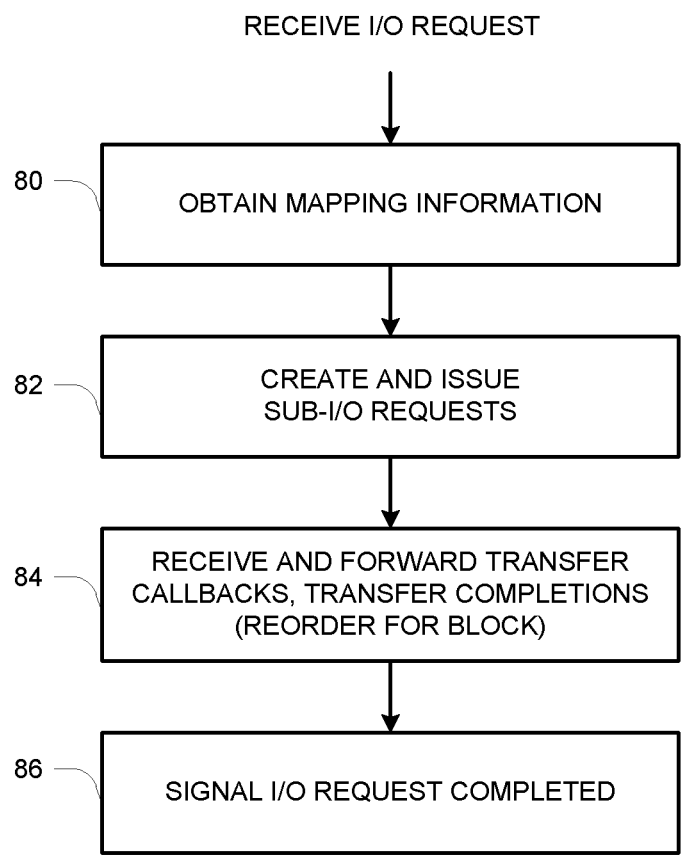
FIG. 5 is a flow diagram of operation of a mapped logical unit (MLU) driver in a data storage system.

FIG. 5 describes operation of the MLU driver 46 in connection with a host I/O request received from the host-side interface 42. At 80, the IOC 58 obtains mapping information for the request by consulting the mapping library 60. Generally, this step requires the IOC 58 to extract the starting LBA request and length from the I/O request and provide them to the mapping library 60, then await the return of the mapping information. Using the example of FIG. 4, the mapping library 60 maintains the map 70 that translates between the LBA range of the I/O request (the three extents 72) and the underlying extents 74 and SLUs 50. In this case, the mapping library 60 returns three mapping values:

(Extent 74-1, SLU 50-1)
(Extent 74-2, SLU 50-1)
(Extent 74-3, SLU 50-2)

The mechanism for returning multiple mapping values is of particular note as explained below. The extents 74 may be identified by starting LBA and length, or some other suitable way. The SLUs 50 are identified by a logical unit name or number, usable in a SCSI command to identify a logical unit of storage being accessed.

At 82, the IOC 58 responds to the return of the three mapping values by creating and issuing respective requests for the extents to CCLA 56, which in turn issues three corresponding sub-I/O requests to the device-side interface 44. These are generally issued in parallel, but some serialization may occur under certain conditions as explained more below. It may be preferable that the sub-I/O requests be issued in address order, e.g., requesting extents 74-1, 74-2 and 74-3 in order. This operation is describe in an example below.

At 84, the MLU driver 46 provides for exchange of transfer-related signaling between the device-side interface 44 and the host-side interface 42 to effect transfer of the data of the I/O request between these components. The signaling is performed using "callbacks" that are registered at the time a service or function is invoked. Two types of callbacks are involved. One is a transfer callback indicating that a transfer is to be initiated. That callback is received from the device-side interface 44, and a corresponding "start transfer" callback is conveyed to the host-side interface 42. The start transfer callback is also referred to as a transfer initiation response herein. Another type of callback is a transfer completed callback indicating that a transfer has been completed. That callback is received from the host-side interface 42, and a corresponding "transfer completed" callback is conveyed to the device-side interface 44. This signaling is described in more detail below.

During processing at 84, the MLU driver 46 monitors for successful completion of all sub-I/O requests. Once this occurs, then at 86 the MLU driver 46 signals to the host-side interface 42 that the processing for the host I/O request has been completed. At this point the host-side interface 42 takes appropriate corresponding action. In the case of a read I/O request, it initiates a read response to the host 14 containing the transferred data. In the case of a write I/O request, it initiates return of a "good" status indicating successful completion of the write.

Certain significant details of the processing of a single mapping callback operation as well as use of resources available for the single mapping operation are described further below.

Figure 6:
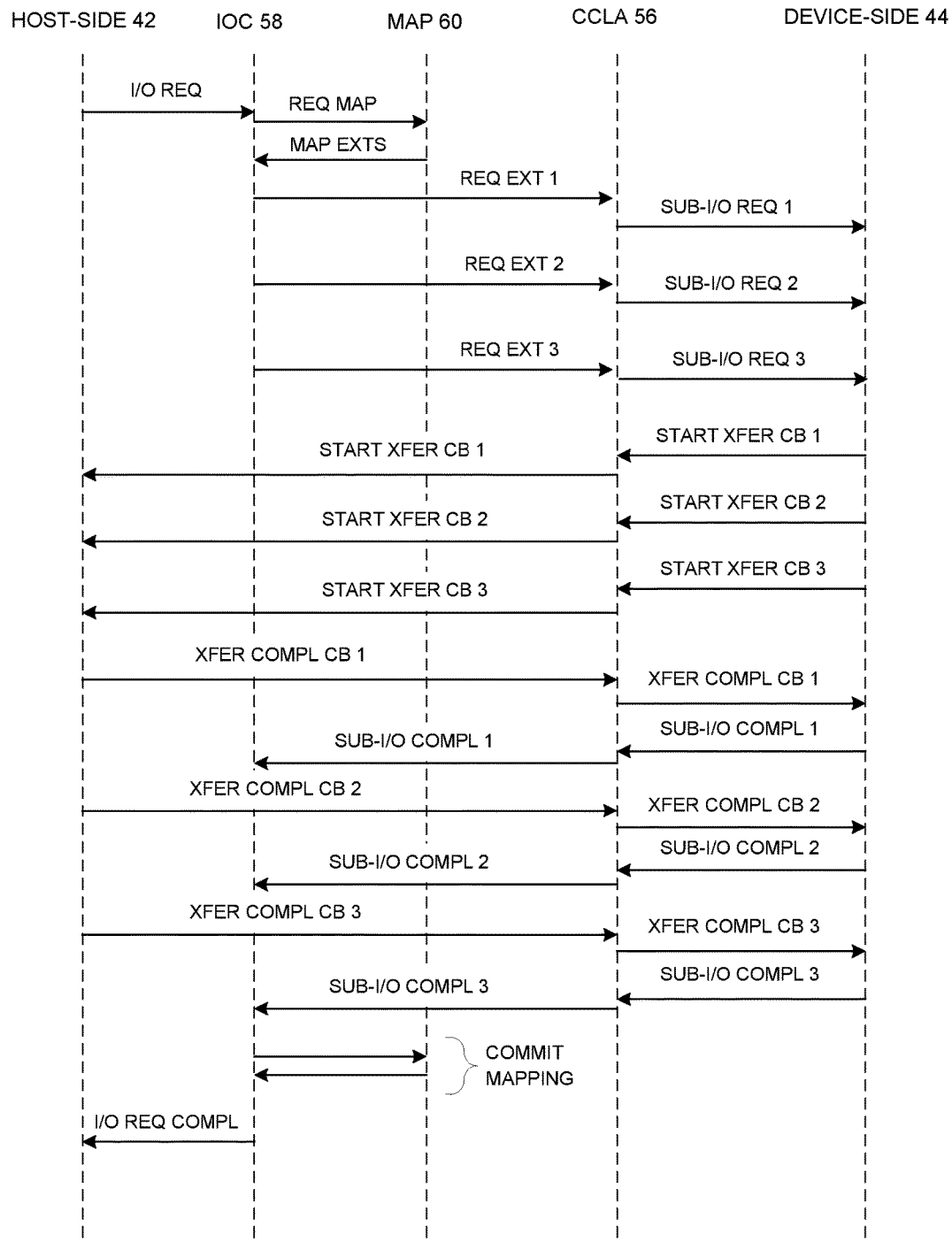
FIGS. 6 and 7 are sequence diagrams of operations involved in processing a host I/O request within a data storage system.
Figure 7:
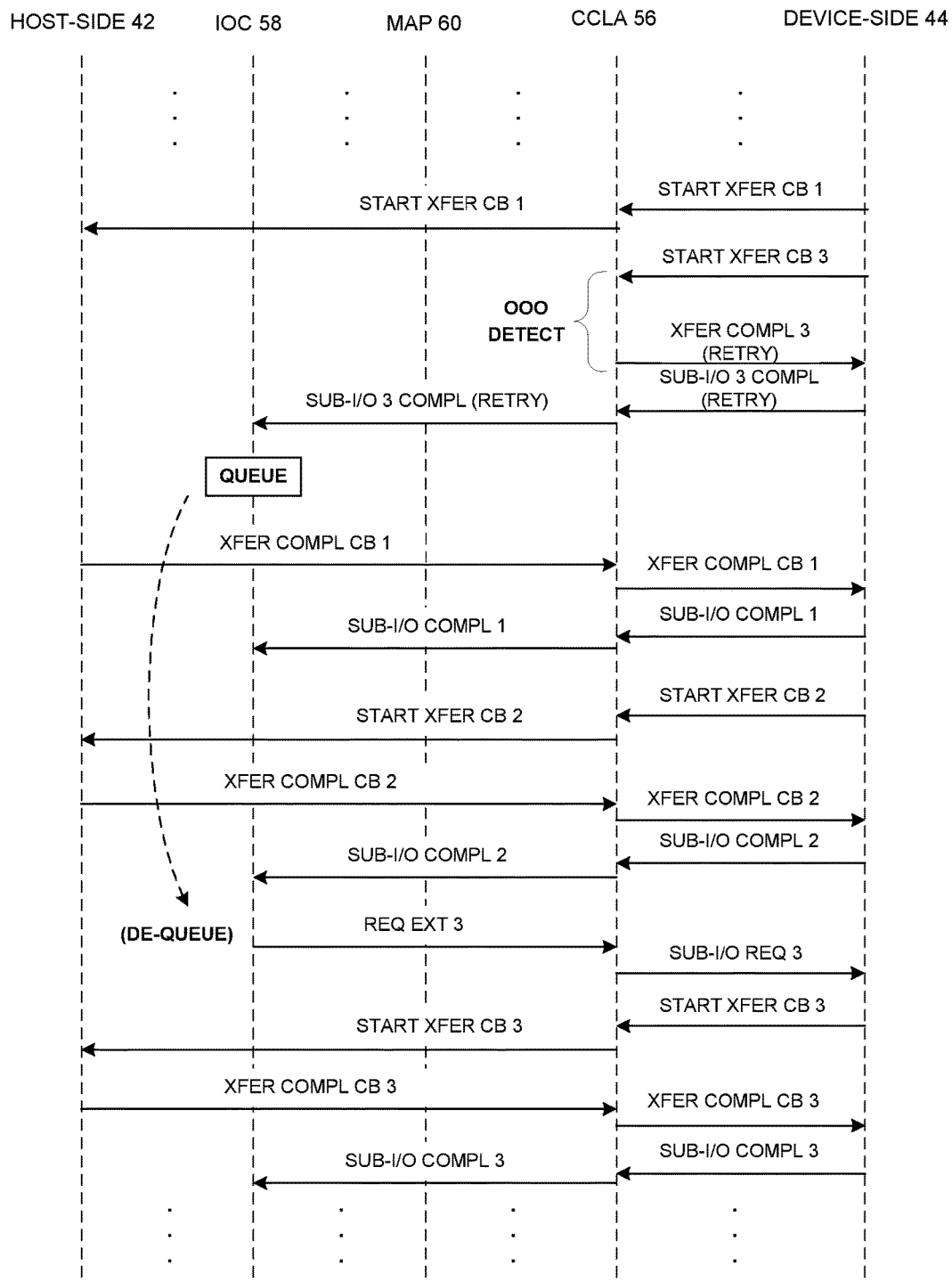

FIGS. 6 and 7 illustrate operation as it involves several components of the organization 40 of FIG. 3, namely the host-side interface 42, IOC 58, mapping library 60, CCLA 56 and device-side interface 44. Each of these is represented by a vertical line in these Figures. Although communications between the IOC 58 and host-side interface 42 may involve the CCUA 54, such involvement does not alter the fundamental operation and is omitted for simplicity. Also as mentioned any effect of a service 62 is also ignored. Horizontal lines with arrows in FIGS. 6 and 7 represent internal messages or operations. Some messages may be transferred using so-called I/O Request Packets or IRPs. Use of IRPs is generally known especially with respect to communicating I/O requests between functional layers of an I/O subsystem.

FIG. 6 describes a first scenario in which commands are processed free of errors and "in order", i.e., with the device-side interface 44 initiating transfer of the extents 74 in address order. Operation begins with a host I/O request (I/O REQ) received by the IOC 58 from the host-side interface 42. The IOC 58 requests and obtains the mapping of extents from mapping library 60 (REQ MAP, MAP EXTS). The mapping library 60 returns mappings for all extents 74 that underlie the LBA range of the I/O request. Assuming the example of FIG. 4, the MAP EXTS response includes the respective LBAs and lengths of the three extents 74-1, 74-2 and 74-3. In one embodiment, all mapping information is returned in a single response. This operation promotes efficiency by reducing messaging overhead, and it also enables the IO 58 to immediately initiate transfer of all the required extents, promoting good performance.

The IOC 58 then issues three separate requests for the identified extents to the CCLA 56 (REQ EXT 1, 2 and 3), which in turn generates three corresponding sub-I/O requests (SUB I/O REQ 1, 2 and 3) to the device-side interface 44. The sub-I/O requests are issued concurrently, i.e., in rapid succession without waiting for any of them to complete. The sub-I/O requests are fully formed requests consistent with the SLU-based representation of storage provided by the device-side interface 44. That is, they may be expressed in SCSI command descriptors and conveyed in IRPs, for example. The sub-I/O requests are issued in "address order", i.e., starting with the extent 74-1 that maps to the extent 72-1 at the beginning of the address range of the host I/O request, then to the next extent 74-2 that maps to the next extent 72-2 in the address range, etc.

When the device-side interface 44 is ready to engage in the data transfer phase of each sub-I/O request, it issues a corresponding start transfer callback (START XFER CB 1, 2, 3) to CCLA 56. For writes and cache-hit reads, this typically occurs immediately. For cache-miss reads the start of the transfer may be delayed by the time required to obtain the extent from a disk 22. In the example of FIG. 6, all three callbacks occur immediately and in address order. The CCLA 56 responds by issuing corresponding start transfer callbacks to the host-side interface 42 (START XFER CB 1, 2 and 3); each of these initiates a transfer of a respective extent. For writes, each extent is transferred from the host-side interface 42 to the device-side interface 44, i.e. to the storage cache therein. For reads, each extent is transferred from the device-side interface 44 (e.g., from the storage cache) to a corresponding buffer of the host-side interface 42. From the perspective of the device-side interface 44, each transfer is a discrete operation independent of the others and may be performed out of order. However, from the perspective of the host-side interface 42 the transfers are portions of an overall data transfer for the host I/O request, and must be performed in address order.

As part of the above operation, the CCLA 56 is monitoring for the in-order occurrence of the start-transfer callbacks from the device-side interface 44. In the illustrated example, this order is 1, 2 and 3 for the extents 74-1, 74-2 and 74-3 respectively. Because the order is maintained in the example of FIG. 6, the transfers can be signaled to the host-side interface 42 as the signaling is received from the device-side interface 44. If it is detected that the start-transfer callbacks occur out of order, then processing is different, as is explained below using another example with reference to FIG. 7.

Finally in the process of FIG. 6, when each transfer is completed the host-side interface 42 issues a corresponding transfer completed callback (XFER COMPL CB 1, 2 and 3) which the CCLA 56 essentially forwards to the device-side interface 44. In response the device-side interface 44 issues corresponding sub-I/O completed messages to CCLA 56 (SUB-I/O COMPL 1, 2 and 3), which are forwarded on to IOC 58. The IOC 58 monitors for successful completion of all the sub-I/O requests, and upon receiving the sub-I/O completed messages for all sub-I/O requests the IOC 58 performs two final tasks. For both reads and writes, it engages in a "commit mapping" exchange with the mapping library 60, informing the mapping library 60 that the I/O request is successfully completed and thus the mapping can be used for subsequent access to the data. The IOC 58 also issues an overall I/O request completion message (I/O REQ COMPL) to the host-side interface 42, which uses this indication to return an appropriate response to the host 14 that issued the I/O request. For a write, this response will be a "good" status indicating successful completion of the write. For a read, this response will be a return of the requested data.

FIG. 7 illustrates an out-of-order example. Up to the point of the first start-transfer callback (START XFER CB 1), processing is the same as in FIG. 6. This is indicated by the vertical ellipses at the top of the flow. However, the next start-transfer callback from the device-side interface 44 is for the third extent 74-3 rather than the second extent 74-2. As shown, the CCLA 56 identifies this out-of-order (OOO) condition and alters the signaling. It first issues a transfer completion signal with a "retry" status (XFER COMPL 3) to the device-side interface 44, indicating that the transfer for the third extent 74-3 is being aborted and will be retried later. The device-side interface 44 responds with a sub-I/O completion message with a "retry" status (SUB-I/O COMPL 3), which is forwarded to the IOC 58. The IOC 58 responds by queuing a retry of the third sub-I/O request.

In the illustrated example the transfer for the first extent 74-1 then completes, similar to the example of FIG. 6, and this is followed by the transfer for the second extent 74-2 which is initiated when the device-side interface 44 issues the start-transfer callback for it (START XFER CB 2). The IOC 58 monitors for completion of sub-I/O request 2 as indicated by the sub-I/O completion message (SUB-I/O COMPL 2). At that point, the IOC 58 de-queues the previously queued third sub-I/O request and re-initiates it by sending a new request for the third extent (REQ EXT 3). In this example the rest of the transfer process for the third extent 74-3 proceeds normally, and upon completion the IOC 58 engages in the commit mapping exchange with the mapping library 60 and returns the overall I/O request completion message to the host-side interface 42 as described with reference to FIG. 6. This is indicated by vertical ellipses at the bottom of the flow.

In the example of FIG. 7 only one sub-I/O request is aborted and then retried later. In general there may be more than one attempted transfer that is identified as out-of-order and thus requires queuing and retrying later. The IOC 58 may issue such multiple queued sub-I/O requests in a parallel fashion similar to the manner of issuing the initial requests in parallel. Typically such retried sub-I/O requests would be expected to be cache hits and thus be completed in order. However, if requests are issued in parallel then it is still necessary to perform OOO detection and to re-order as may be necessary, using the mechanism described above with reference to FIG. 7. Alternatively, the IOC 58 may enforce serial execution of any retried sub-I/O requests, i.e., only initiating one when all those preceding have fully completed as indicated by receiving the respective sub-I/O completion messages. A hybrid approach could be to retry in parallel for a first OOO detection for a given sub-I/O request, and then switching to serial retrying if there are any subsequent additional OOO detections for the same or even a different sub-I/O request. Switching to serial processing can help ensure progress and completion, avoiding deadlocks or other undesirable operating conditions.

The above parallel processing of multiple sub-I/O requests for a given host I/O request is not necessarily exclusive of also using serial processing if and when appropriate. Serial processing may be preferred for some types of mapping extents, for example, so the type of processing can be conditioned on whether or not the mapping extents are of such type. In some embodiments, the use of parallel versus serial processing may be selectable in some manner, so parallel processing would only occur in a selected parallel-processing mode of operation. Another possible alternative is the manner of aborting in-progress sub-I/O requests when an OOO situation is detected. In the illustrated embodiment this occurs at the beginning of the data transfer phase. In an alternative embodiment, the aborting and retrying may occur later, even as late as the completion of the sub-I/O request.

While the re-ordering of the transfers for sub-I/O requests as described above includes an "abort" of the transfer of a previously initiated sub-I/O request, the abort is a normal occurrence given non-zero cache miss rates and is followed by re-initiating the affected sub-I/O request later to achieve the desired ordering of the transfers. There can also be abnormal situations that need to be handled appropriately given the possibility of multiple parallel sub-I/O requests outstanding at the same time. Two such situations are cancellation and errors. Many systems permit an initiator of an I/O operation to cancel that operation. If a host I/O request is cancelled, it is necessary to cancel uncompleted sub-I/O requests. For the sake of coherence, this is done in a serial rather than parallel fashion. An example is used to illustrate. If a host I/O request is broken into 5 sub-I/O requests and the first two have completed at the time of cancellation, then the MLU driver 46 cancels the remaining three in order. It first waits for the start transfer callback for the third sub-I/O request and responds to the device-side interface 44 with a transfer complete message, similar to the situation of OOO detection as described with reference to FIG. 7, except that the "retry" indication is not made. This signals to the device-side interface 44 that the sub-I/O request is cancelled. The device-side interface 44 responds with the sub-I/O completed callback, which is used by the IOC 58 to clear any remaining state for the sub-I/O request. The IOC 58 then initiates cancellation of the next sub-I/O request, e.g. the fourth in this example, and the process is repeated serially until the last sub-I/O request has been cancelled. Errors can be handled in a similar fashion. If an error is encountered that makes it unnecessary to complete the remaining processing for a host I/O request, the outstanding sub-I/O requests can be cancelled using the same process. Cancellations and errors are also referred to as "interrupting events" herein due to their effect of interrupting normal processing.

Extension to File I/O

As mentioned, the disclosed technique can be applied to file I/O as initiated from the hosts 14 to the data storage system 10 configured as a network attached storage (NAS) server. The I/Os from the NAS server may be separately buffered within the data storage system 10, and if so then the order in which such buffers are filled (for reads) or emptied (for writes) is not important, as the buffers are logically transferred as complete units. Thus for file I/O it may not be required that the transfers for the sub-I/O requests be performed in order at the host-side interface 42, which means that the requirement for OOO detection and reordering such as described above can be relaxed. There can still be performance benefits to the features of receiving all mapping information in one mapping callback and in issuing multiple sub-I/O requests concurrently (in parallel) rather than serially, so these features may still be employed even though the order enforcement feature is not.

Another feature that may be used in some embodiments is implementation of separate "fast" and "slow" lookup paths in the mapping library 60, to more efficiently support mixes of device types. Specifically, for a direct-mapped LUN (DLU), a lookup for a given LBA range of a host I/O request always returns a corresponding single range on an underlying SLU (i.e., starting LBA to which the starting LBA of the DLU-referenced request is mapped). This is in contrast to thin LUNs (TLUs) for which there may be an arbitrary number of distinct extents 74 that provide the underlying storage for a given LBA range of the TLU. The mapping library 60 may be designed with separate structures and lookup mechanisms for the two type of lookups. Because the direct-mapped lookup for DLUs is simple, it is also fast, and hence this type of lookup can be viewed as a "fast path" lookup in contrast to the more complex and thus slower "slow path" lookup for TLUs.

One significance of the use of the fast/slow path structuring of the mapping library 60 is the effect of the use of "snapshots" or point-in-time copies of production LUNs. Even for DLUs, snapshotting almost always employs thin-LUN techniques that describe snapshots as differences or "deltas" from the current production LUN contents. Thus when a DLU is "snapped", i.e., has a snapshot created, the mapping becomes more like the mapping for TLUs. A lookup on the fast path for a DLU might be responded to with an indication that it should be retried on the slow path, in which case the IOC 58 must be able to switch to using multiple sub-I/O requests as described above rather than expecting a single mapping value and simply issuing one I/O request to a direct-mapped extent.

As noted above, there are noteworthy details of the processing of FIG. 5. While the single mapping response with a listing of all required extents promotes efficiency, it is still important that the multiple operations for the various extents (FIGS. 6 and 7) be performed reliably and efficiently as possible. The IOC 58 employs sub-I/O tracking structures or SIOTS to internally track the completion of the respective sub-I/O requests for the extents needed to fulfill each host I/O request. The SIOTS are themselves resources that require management and efficient utilization. The IOC 58 employs resource allocation intelligence for this purpose. In one embodiment, the IOC 58 uses the so-called "banker's algorithm" for such resource allocation. The banker's algorithm promotes not only efficiency but also safety by avoidance of deadlocks.

Since all the extent information is available in a single mapping operation the IOC 58 makes more intelligent decisions about underlying SIOTS allocation. There is also the opportunity for increased parallelism. With the single mapping operation the IOC 58 can accurately predict the number of SIOTS required for a host I/O request to be processed without getting blocked/queued. Once a mapping response has been received and thus the number of extents needed for a given host I/O request is known, the IOC 58 begins the processing for the extents only after successfully reserving a corresponding number of SIOTS. If initially there are not a sufficient number of SIOTS available, then the IOC 58 simply waits for SIOTS to be freed up by completion of previously initiated requests, and once the required number are available they are reserved and used for obtaining the extents for the new host I/O request. As the processing of each extent is completed, the corresponding SIOTS is freed up to be available for processing subsequent host I/O requests.

Figure 8:
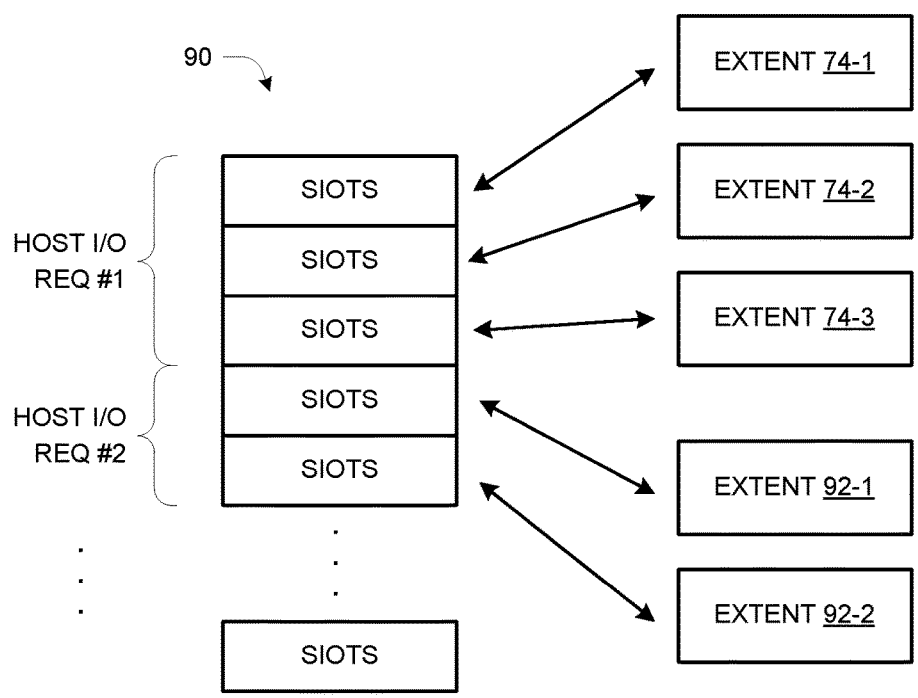
FIG. 8 is a schematic diagram of a collection of sub-I/O request tracking structures.

The above is more fully described with reference to FIGS. 8 and 9. The collection of SIOTS is shown at 90. In this example, three SIOTS have been allocated for processing the sub-I/O requests (for extents 74-1 through 74-3) for a first host I/O request. Two additional SIOTS have been allocated for processing the sub-I/O requests (for extents 92-1 and 92-2) for a second host I/O request. As each sub-I/O request completes, the corresponding SIOTS is freed up to be available to be allocated for processing another sub-I/O request, generally of another host I/O request.

Figure 9:
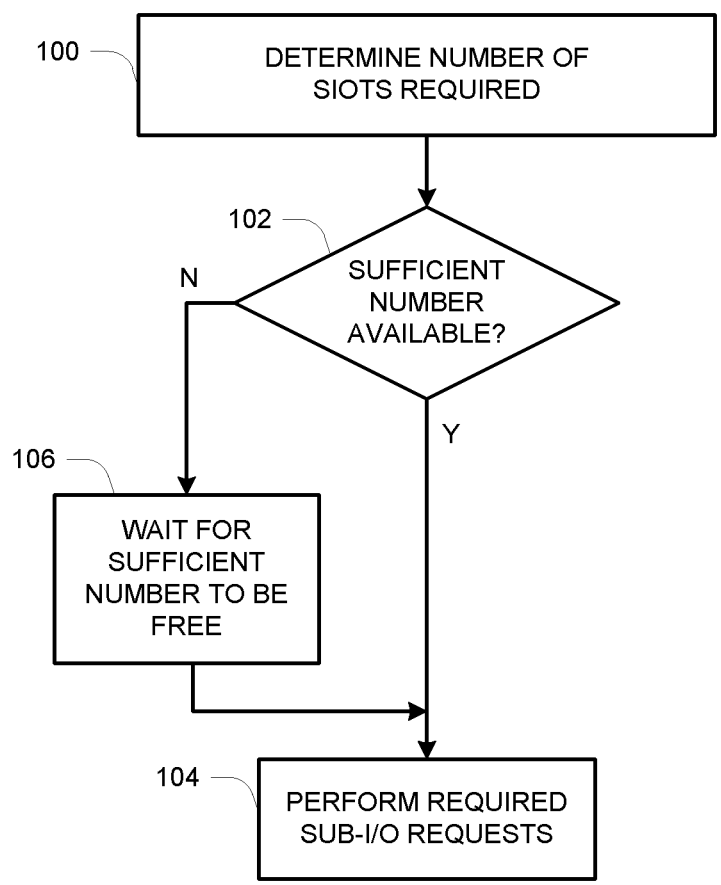
FIG. 9 is a flow diagram describing use of the sub-I/O request tracking structures in connection with processing a host I/O request.

FIG. 9 shows the logic associated with use of the SIOTS 90 in connection with a single host I/O request, which is part of (p/o) the processing of step 82 described above with reference to FIG. 5. At 100, it is determined how many SIOTS are required, which corresponds to the number of extents identified in the mapping response. At 102, it is determined whether there are a sufficient number of free SIOTS available. If so, then at 104 the sub-I/O requests for the host I/O request are all performed, as described above. If not, then at 106 the processing waits for the sufficient number of SIOTS to become available, and then proceeds to step 104 to process all the sub-I/O requests.

While various embodiments of the invention have been particularly shown and described, it will be understood by those skilled in the art that various changes in form and details may be made therein without departing from the spirit and scope of the invention as defined by the appended claims.

What is claimed is:

1. A method of operating a data storage system, comprising:
   receiving a host I/O request from a host-side interface of the data storage system, the host I/O request specifying a range of logical block addresses (LBAs) of a mapped logical unit (MLU) of storage presented to an external host computer by the host-side interface, the MLU being mapped through a device-side interface to a plurality of underlying logical units of storage;
   obtaining, in response to receiving the host I/O request, mapping information for a plurality of extents of the underlying logical units of storage, the extents being mapped to respective sub-ranges of the range of LBAs, the host-side interface being configured to transfer the extents during a subsequent transfer phase;
   upon obtaining the mapping information, determining whether there are a sufficient number of free sub-I/O request tracking structures to track completion of a plurality of respective sub-I/O requests to be used for the extents of the underlying logical units of storage, and only upon there being such a sufficient number of free sub-I/O request tracking structures, then concurrently issuing to the device-side interface, using the mapping information, the plurality of sub-I/O requests for the extents of the underlying logical units of storage, the device-side interface providing respective transfer initiation responses for the sub-I/O requests to initiate transfer of the respective extents;
   receiving the transfer initiation responses from the device-side interface and forwarding the transfer initiation responses to the host-side interface to cause the respective extents to be transferred by the host-side interface in the transfer phase; and
   as the transfer initiation responses are forwarded to the host-side interface, freeing the respective sub-I/O request tracking structures for use in processing subsequent host I/O requests.

2. The method of claim 1, wherein:
   the extents have a logical order according to an address order of the respective sub-ranges of the range of LBAs, and the host-side interface is configured to transfer the extents in the logical order during the transfer phase;
   the transfer initiation responses are returned in an initial order independent of the logical order of the respective extents; and
   forwarding the transfer initiation responses includes selectively re-ordering the transfer initiation responses as necessary to provide the transfer initiation responses to the host-side interface in the logical order of the respective extents.

3. The method of claim 2, wherein selectively re-ordering the transfer initiation responses includes:
   detecting an out-of-order transfer initiation response for one of the extents, the one extent being preceded in the logical order by a preceding extent for which a transfer initiation response has not yet been received;
   refraining from forwarding the out-of-order transfer initiation response to the host-side interface;
   at a later time when the transfer initiation response for the preceding extent has been received and forwarded to the host-side interface, re-issuing the sub-I/O request for the one extent to the device-side interface, the device-side interface subsequently providing a second transfer initiation response for the re-issued sub-I/O request; and
   receiving the second transfer initiation response from the device-side interface and forwarding the second transfer initiation response to the host-side interface to cause the one extent to be transferred by the host-side interface in the transfer phase.

4. The method of claim 3, further including, as part of refraining from forwarding the out-of-order transfer initiation response, issuing a sub-I/O request completion message to the device-side interface to abort transfer of the one extent, the sub-I/O request completion message including a retry indicator indicating that the sub-I/O request for the one extent will be reissued at a later time as part of the selective re-ordering.

5. The method of claim 2, wherein:
the device-side interface includes a memory-based storage cache for caching the underlying units of logical storage of the MLU;
the data transfer phase includes transfer of the extents between the host-side interface and the storage cache; and
the initial order of the transfer initiation responses is based on a pattern of cache hits and misses for the respective extents in the storage cache, a cache hit for a given extent causing immediate return of a corresponding transfer initiation response which is out of order when not preceded by a transfer initiation response for a preceding extent in the logical order due to a cache miss for the preceding extent.

6. The method of claim 2, wherein the transfer phase is interrupted when an interrupting event occurs, the interrupting event including cancellation of the host-I/O or occurrence of an error after the sub-I/O requests have been issued but have not yet completed, and further including, upon detecting the interrupting event, serially cancelling all issued but non-completed sub-I/O requests.

7. The method of claim 1, wherein obtaining the mapping information includes (1) issuing a request for the mapping information to a mapping library, and (2) receiving a mapping information response including identifications of the plurality of extents, and wherein the plurality of sub-I/O requests are issued concurrently after receiving the mapping information response.

8. The method of claim 7, wherein the mapping library includes separate fast and slow lookup paths for efficient lookup of mapping information for different mapped device types including a direct-mapped logical unit (DLU) and a thin logical unit (TLU), a lookup for the DLU being performed on the fast path and generally returning a single mapping value for an extent spanning an LBA range of a DLU host I/O request, a lookup for the TLU generally returning a plurality of mapping values for a set of respective distinct extents for an LBA range of a TLU host I/O request, and wherein the MLU is a TLU and the mapping information is obtained using the slow path.

9. The method of claim 8, wherein the DLU has a base and associated snapshots maintained as TLU types with respect to the base, and wherein a lookup for the DLU on the fast path is responded to with an indication that a lookup should be performed on the slow path due to the presence of the associated snapshots for which the mapping information includes a plurality of mapping values.

10. The method of claim 1, wherein:
the host I/O request is a file I/O request for a portion of a file, the portion of the file being stored in a buffer for transfer during the transfer phase;
the extents have a logical order according to an address order of the respective sub-ranges of the range of LBAs, and the host-side interface is configured to transfer the extents to or from the buffer;
the transfer initiation responses are returned in a response order independent of the logical order of the respective extents; and
the transfer initiation responses are forwarded irrespective of the logical order of the respective extents.

11. The method of claim 1, wherein one sub-I/O request tracking structure is utilized to track completion of a corresponding one the sub-I/O requests for a corresponding extent, so that the sufficient number is equal to the number of extents identified in the mapping information.

12. A method of operating a data storage system, comprising:
receiving a host I/O request from a host-side interface of the data storage system, the host I/O request specifying a range of logical block addresses (LBAs) of a mapped logical unit (MLU) of storage presented to an external host computer by the host-side interface, the MLU being mapped through a device-side interface to a plurality of underlying logical units of storage;
obtaining, in response to receiving the host I/O request, mapping information for a plurality of extents of the underlying logical units of storage, the extents being mapped to respective sub-ranges of the range of LBAs, the host-side interface being configured to transfer the extents during a subsequent transfer phase, the mapping information being obtained by (1) issuing a request for the mapping information to a mapping library, and (2) receiving a mapping information response including identifications of the plurality of extents;
upon obtaining the mapping information, determining whether there are a sufficient number of free sub-I/O request tracking structures to track completion of a plurality of respective sub-I/O requests to be used for the extents of the underlying logical units of storage, and only upon there being such a sufficient number of free sub-I/O request tracking structures, then concurrently issuing to the device-side interface, using the mapping information, the plurality of sub-I/O requests for the extents of the underlying logical units of storage, the device-side interface providing respective transfer initiation responses for the sub-I/O requests to initiate transfer of the respective extents;
receiving the transfer initiation responses from the device-side interface and forwarding the transfer initiation responses to the host-side interface to cause the respective extents to be transferred by the host-side interface in the transfer phase; and
as the transfer initiation responses are forwarded to the host-side interface, freeing the respective sub-I/O request tracking structures for use in processing subsequent host I/O requests.

13. A data storage system, comprising:
one or more back-end nonvolatile storage devices; and
one or more storage processors coupled to the back-end nonvolatile storage devices, the storage processors being computerized devices including memory, processors and input/output interface circuitry coupled together by one or more data buses, the input/output interface circuitry providing a connection to a network over which the data storage system receives host I/O requests from remote host computers, the memory storing computer program instructions executed by the processors to cause the data storage system to perform a method including:
receiving a host I/O request from a host-side interface of the data storage system, the host I/O request specifying a range of logical block addresses (LBAs) of a mapped logical unit (MLU) of storage presented to an external host computer by the host-side interface, the MLU being mapped through a device-side interface to a plurality of underlying logical units of storage;

obtaining, in response to receiving the host I/O request, mapping information for a plurality of extents of the underlying logical units of storage, the extents being mapped to respective sub-ranges of the range of LBAs, the host-side interface being configured to transfer the extents during a subsequent transfer phase;

upon obtaining the mapping information, determining whether there are a sufficient number of free sub-I/O request tracking structures to track completion of a plurality of respective sub-I/O requests to be used for the extents of the underlying logical units of storage, and only upon there being such a sufficient number of free sub-I/O request tracking structures, then concurrently issuing to the device-side interface, using the mapping information, the plurality of sub-I/O requests for the extents of the underlying logical units of storage, the device-side interface providing respective transfer initiation responses for the sub-I/O requests to initiate transfer of the respective extents;

receiving the transfer initiation responses from the device-side interface and forwarding the transfer initiation responses to the host-side interface to cause the respective extents to be transferred by the host-side interface in the transfer phase; and as the transfer initiation responses are forwarded to the host-side interface, freeing the respective sub-I/O request tracking structures for use in processing subsequent host I/O requests.

14. The data storage system of claim 13, wherein:
the extents have a logical order according to an address order of the respective sub-ranges of the range of LBAs, and the host-side interface is configured to transfer the extents in the logical order during the transfer phase;
the transfer initiation responses are returned in an initial order independent of the logical order of the respective extents; and
forwarding the transfer initiation responses includes selectively re-ordering the transfer initiation responses as necessary to provide the transfer initiation responses to the host-side interface in the logical order of the respective extents.

15. The data storage system of claim 14, wherein selectively re-ordering the transfer initiation responses includes:
detecting an out-of-order transfer initiation response for one of the extents, the one extent being preceded in the logical order by a preceding extent for which a transfer initiation response has not yet been received;
refraining from forwarding the out-of-order transfer initiation response to the host-side interface;
at a later time when the transfer initiation response for the preceding extent has been received and forwarded to the host-side interface, re-issuing the sub-I/O request for the one extent to the device-side interface, the device-side interface subsequently providing a second transfer initiation response for the re-issued sub-I/O request; and
receiving the second transfer initiation response from the device-side interface and forwarding the second transfer initiation response to the host-side interface to cause the one extent to be transferred by the host-side interface in the transfer phase.

16. The data storage system of claim 15, wherein the method performed by the data storage system further includes, as part of refraining from forwarding the out-of-order transfer initiation response, issuing a sub-I/O request completion message to the device-side interface to abort transfer of the one extent, the sub-I/O request completion message including a retry indicator indicating that the sub-I/O request for the one extent will be reissued at a later time as part of the selective re-ordering.

17. The data storage system of claim 14, wherein:
the device-side interface includes a memory-based storage cache for caching the underlying units of logical storage of the MLU;
the data transfer phase includes transfer of the extents between the host-side interface and the storage cache; and
the initial order of the transfer initiation responses is based on a pattern of cache hits and misses for the respective extents in the storage cache, a cache hit for a given extent causing immediate return of a corresponding transfer initiation response which is out of order when not preceded by a transfer initiation response for a preceding extent in the logical order due to a cache miss for the preceding extent.

18. The data storage system of claim 14, wherein the transfer phase is interrupted when an interrupting event occurs, the interrupting event including cancellation of the host-I/O or occurrence of an error after the sub-I/O requests have been issued but have not yet completed, and further including, upon detecting the interrupting event, serially cancelling all issued but non-completed sub-I/O requests.

19. The data storage system of claim 13, wherein obtaining the mapping information includes (1) issuing a request for the mapping information to a mapping library, and (2) receiving a mapping information response including identifications of the plurality of extents, and wherein the plurality of sub-I/O requests are issued concurrently after receiving the mapping information response.

20. The data storage system of claim 13, wherein one sub-I/O request tracking structure is utilized to track completion of a corresponding one the sub-I/O requests for a corresponding extent, so that the sufficient number is equal to the number of extents identified in the mapping information.

* * * * *